United States Patent
Duan et al.

(10) Patent No.: US 11,236,604 B2
(45) Date of Patent: Feb. 1, 2022

(54) SIMULATED ANNEALING OPTIMIZATION OF WELL PRODUCTION FORECASTS

(71) Applicant: Halliburton Energy Services, Inc., Houston, TX (US)

(72) Inventors: Hongyan Duan, Houston, TX (US); Donghong Pei, Houston, TX (US); Eric Howard Holley, Tomball, TX (US); Dion Clarence Thomas Billard, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 658 days.

(21) Appl. No.: 16/111,130

(22) Filed: Aug. 23, 2018

(65) Prior Publication Data
US 2020/0063551 A1 Feb. 27, 2020

(51) Int. Cl.
*E21B 47/07* (2012.01)
*G01K 1/02* (2021.01)
*E21B 47/103* (2012.01)
*E21B 43/14* (2006.01)

(52) U.S. Cl.
CPC ............ *E21B 47/07* (2020.05); *E21B 47/103* (2020.05); *G01K 1/026* (2013.01); *E21B 43/14* (2013.01); *E21B 2200/20* (2020.05)

(58) Field of Classification Search
None
See application file for complete search history.

(56) References Cited

U.S. PATENT DOCUMENTS

| 8,335,677 | B2* | 12/2012 | Yeten | E21B 43/00 703/10 |
| 2012/0130696 | A1* | 5/2012 | Davidson | G06Q 10/04 703/10 |
| 2016/0356125 | A1* | 12/2016 | Bello | E21B 43/14 |
| 2017/0067335 | A1* | 3/2017 | Weng | E21B 47/10 |
| 2017/0145813 | A1* | 5/2017 | Horesh | E21B 43/14 |

(Continued)

OTHER PUBLICATIONS

Almulla, Jassim Mohammed; Utilizing Distributed Temperature Sensors in Predicting Flow rates in Multilateral Wells; 2012, May; p. 1-115 (Year: 2012).*

(Continued)

*Primary Examiner* — Arleen M Vazquez
*Assistant Examiner* — Terence E Stifter, Jr.
(74) *Attorney, Agent, or Firm* — Haynes and Boone, LLP

(57) ABSTRACT

System and methods for optimizing flow distribution across multiple production zones are provided. A flow distribution is assigned to a plurality of production zones along a wellbore within a formation. A temperature value is estimated for each of the production zones, based on the assigned flow distribution. The estimated temperature value is compared with an actual temperature value determined for each production zone. An error amount for the estimated temperature value is calculated based on the comparison. Based on the error amount, it is determined whether or not the flow distribution has reached a global optimum. The assigning, the estimating, the comparing, the calculating, and the determining are repeated until it is determined that the flow distribution assigned to the plurality of production zones has reached the global optimum.

18 Claims, 7 Drawing Sheets

(56) References Cited

U.S. PATENT DOCUMENTS

2019/0153854 A1* 5/2019 Manin .................... E21B 43/14

OTHER PUBLICATIONS

Liang Biao Ouyang, SPE, Dave Belanger, SPE, Chevron Texaco Energy Technology Company (ETC), Flow Profiling via Distribute Temperature Sensor (DTS) System—Expectation and Reality, SPE International, Sep. 26-29, 2004, 14 pages, SPE 90541, SPE Annual Technical Conference and Exhibition held in Houston, Texas, U.S.A.

X. Wang, SPE, J. Lee, SPE, B. Thigpen, SPE, G. Vachon, SPE, S. Poland, SPE, and D. Nortonspe, Baker Hughes Productionquest, Modeling Flow Profile Using Distributed Temperature Sensor (DTS) System, SPE International, Feb. 25-27, 2008, 11 pages, SPE 111790, SPE Intelligent Energy Conference and Exhibition held in Amsterdam, The Netherlands.

H. Huebsch, M. Moss, and T. Trilsbeck, Encana, and G. Brown, S. Rogers, and T. Bouchard, Schlumberger, Monitoring Inflow Distribution in Multi-zone, Velocity String Gas Wells Using Slickline Deployed Fiber Optic Distributed Temperature Measurements, SPE International, Sep. 21-24, 2008, 15 pages, SPE 115816, SPE Annual Technical Conference and Exhibition held in Denver, Colorado, U.S.A.

Interpretive Software Products, Inc., Plato DTS Interpretive Software for DTS Data, 2015, 1 Page.

\* cited by examiner

SIMULATED ANNEALING OPTIMIZATION OF WELL PRODUCTION FORECASTS

FIELD OF THE DISCLOSURE

The present disclosure relates generally to simulating hydrocarbon production from a subsurface reservoir formation and particularly, to modeling flow profiles for simulated hydrocarbon production from multiple production zones along a wellbore drilled within a reservoir formation.

BACKGROUND

A major challenge during hydrocarbon production operations is analyzing the flow of hydrocarbons produced over a relatively large number of production zones along a wellbore. Production analysis typically involves using an inverse model to reach a global optimization between downhole temperature measurements and predicted temperature values. However, conventional solutions generally rely on inverse models that provide only a local optimization of the flow distribution across multiple production zones. Consequently, the resulting flow distribution produced by such solutions may be prone to being trapped in a local minimum.

DESCRIPTION OF ILLUSTRATIVE EMBODIMENTS

Figure 1:
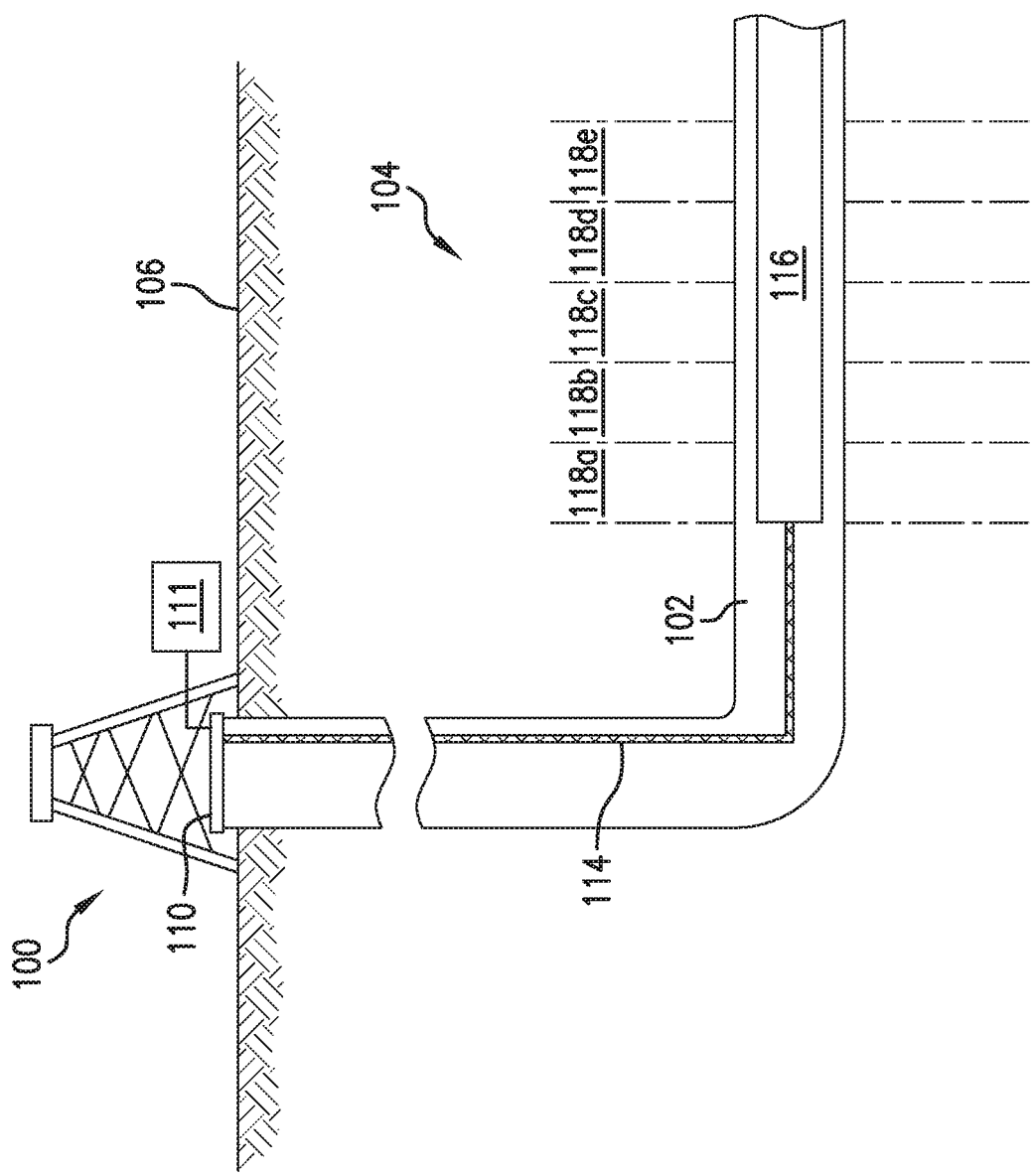
FIG. 1 is a diagram of an illustrative well system for performing a downhole operation along multiple sections of a wellbore within a reservoir formation.

Embodiments of the present disclosure relate to optimizing flow distribution for multiple production zones along a wellbore. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

Embodiments of the present disclosure may be used to monitor and control the flow of hydrocarbons from multiple productions zones along a planned path of a wellbore within a reservoir formation. The production zones may correspond to different areas of the formation surrounding one or more sections of the wellbore along its path through the formation. In one or more embodiments, stochastic optimization may be used in conjunction with a forward production model to determine a globally optimal flow distribution for a plurality of the production zones during a downhole operation performed along the wellbore. For example, a global optimization scheme (e.g., simulated annealing) may be used with the forward production model to estimate hydrocarbon flow between the production zones and corresponding sections of the wellbore at different depths or locations within the formation. The results of the simulation may include estimated values of temperature at those depths/locations along the wellbore. The estimated values may be compared to actual values of the temperature based on measurements obtained from downhole sensors coupled to a drill string disposed within the wellbore. The downhole sensors may be, for example, fiber-optic sensors coupled to or included within a bottomhole assembly of the drill string. In one or more embodiments, the fiber-optic sensors may be associated with a distributed temperature sensing (DTS) subsystem of a well system used to perform downhole operations, including production operations, along one or more sections of the wellbore, as will be described in further detail below.

In one or more embodiments, simulated annealing may be applied to the forward production model described above to reach a global optimization between the actual temperature values obtained from the DTS measurements and the estimated values obtained from the flow simulation for the plurality of production zones, even in cases involving relatively large numbers of production zones and relatively low temperature variation in the DTS data obtained for each zone. The temperature values produced by such an optimized production model may serve as qualitative and/or quantitative indicators of the downhole flow distribution across multiple production zones during a given stage of the downhole operation. Such indicators may then be used to make appropriate adjustments to one or more operational parameters to improve hydrocarbon production during that stage of the operation and/or a subsequent stage of the operation to be performed along the wellbore. In some implementations, such adjustments may include making changes to the planned path of the wellbore through the formation.

Illustrative embodiments and related methodologies of the present disclosure will be described in further detail below in reference to FIGS. 1-7, e.g., as they might be employed in a computer system for performing the multi-zone production optimization techniques disclosed herein during production operations at a wellsite. In some implementations, the disclosed techniques may be performed as part of a wellsite production monitoring and control application provided by the computer system, based on real-time DTS data acquired for multiple production zones along one or more sections of the wellbore.

Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a diagram of an illustrative well system 100 for performing a downhole operation at a wellsite. As shown in FIG. 1, the downhole operation may be performed along a wellbore 102 drilled within a reservoir formation 104 beneath a surface 106 of the wellsite. Reservoir formation 104 may be any type of rock formation (e.g., shale, coal, sandstone, granite, and/or others) that includes hydrocarbon deposits, e.g., oil and/or natural gas. Reservoir formation 104 may be composed of naturally fractured rock and/or natural rock formations that are not fractured to any significant degree. While wellbore 102 is depicted as a horizontal wellbore in FIG. 1, it should be appreciated that embodiments of the present disclosure are not intended to be limited thereto and that the disclosed multi-zone production optimization techniques may be applied to wellbores having other orientations including vertical wellbores, deviated or slanted wellbores, multilateral wellbores or the like. Further, while wellbore 102 may be depicted as a cased hole in FIG. 1, it should be appreciated that the disclosed techniques may be applied to open-hole operations.

The downhole operation performed using well system 100 may include, but is not limited to, drilling, completion, production, injection, or a combination of such operations. For example, well system 100 may include a fluid injection subsystem for injecting treatment fluid, e.g., hydraulic fracturing fluid, into reservoir formation 104 (e.g., during a fluid injection phase of the operation) as well as a fluid production system for recovering hydrocarbons from reservoir formation 104 (e.g., during a fluid production phase of the operation).

In one or more embodiments, the downhole operation (e.g., both injection and production phases) may be performed over multiple sections 118a, 118b, 118c, 118d, and 118e (collectively referred to herein as "sections 118") of wellbore 102. The area of formation 104 surrounding each of sections 118 may correspond to, for example, a different production zone at a particular depth or location (or depth/location range) along wellbore 102. The respective boundaries of sections 118 and corresponding production zones along the length of wellbore 102 may be delineated by the locations of bridge plugs, packers and/or other types of equipment (not shown) in wellbore 102. Although five sections are shown in FIG. 1, it should be appreciated that the downhole operation may performed over any number of wellbore sections, as desired for a particular implementation. Furthermore, while sections 118 as shown in FIG. 1 appear to be uniform in size or length, it should be appreciated that each of sections 118 may be any of various sizes or lengths along wellbore 102, as desired for a particular implementation.

In one or more embodiments, well system 100 may include a control subsystem 111, a signaling subsystem 114, and a bottomhole assembly (BHA) 116. BHA 116 may be attached to a distal end of a drill string disposed within wellbore 102. As will be described in further detail below, BHA 116 may include different types of downhole tools for performing various functions related to the downhole operation being performed along wellbore 102, including those related to the functions of the injection and production subsystems described above. In one or more embodiments, the different types of downhole tools of BHA 116 may be coupled to sections 118 of wellbore 102 through tubing, pipe, or other conduit, and isolated from one another in wellbore 102 by packers or other devices installed in the wellbore 102.

While not shown in FIG. 1, it should be appreciated that well system 100 may include any number of additional components or subsystems for implementing the multi-zone production optimization techniques disclosed herein. For example, well system 100 may include any number of computing subsystems, communication subsystems, pumping subsystems, monitoring subsystems, and/or other features as desired for a particular implementation. In some implementations, control subsystem 111 may be communicatively coupled to a remote computing system (not shown) for exchanging information via a network for purposes of remote monitoring and controlling of wellsite operations. Such a network may include one or more communication networks, for example and without limitation, a local area network, medium area network, and/or a wide area network, e.g., the Internet. It should be appreciated that control subsystem 111 may include data processing equipment, communication equipment, and any other equipment for providing the functionality described herein.

In one or more embodiments, control subsystem 111 in conjunction with the production and injection subsystems of well system 100 may be used to control the flow of fluids into and out of the areas of reservoir formation 104 surrounding each of sections 118 along wellbore 102. For example, control subsystem 111 may communicate with a fluid injection subsystem of well system 100 to control fluid injection into formation 104 during a fluid injection phase of the downhole operation. The treatment fluid may be injected into formation areas surrounding wellbore 102 via a plurality of formation entry points along one or more sections 118. Likewise, control subsystem 111 may communicate with a production subsystem of well system 100 to control hydrocarbon production from multiple production zones within formation 104 during a production phase of the operation. The production zones may correspond to the surrounding formation areas in which the treatment fluid was injected during the injection phase of the operation. Thus, fluids may be produced from formation 104 via the same formation entry points used to inject fluid into formation 104 along one or more sections 118 of wellbore 102. The formation entry points may be, for example, open-hole sections along an uncased portion of the wellbore path, a cluster of perforations along a cased portion of the wellbore path, ports of a sliding sleeve completion device along the wellbore path, slots of a perforated liner along the wellbore path, or any combination of the foregoing.

In one or more embodiments, the fluid injection and production subsystems described above may use any combination of valves, sliding sleeves, actuators, ports, and/or other types of devices for controlling the flow of fluids between wellbore 102 and reservoir formation 104 via the formation entry points. Such flow control devices may be housed within BHA 116, e.g., as part of downhole injection and/or production tools for controlling the location, rate, orientation, and/or other properties of fluid flow between wellbore 102 and formation 104. In one or more embodiments, the configuration and/or operation of such devices and other downhole tools within BHA 116 may be controlled by control subsystem 111 based on commands or control signals transmitted via signaling subsystem 114 from a surface 110 of wellbore 102 to the downhole tools of BHA 116. Examples of different ways to control the operation of flow control devices within BHA 116 include, but are not limited to, opening, closing, restricting, dilating, repositioning, reorienting, and/or otherwise manipulating the devices to modify the manner in which treatment fluid, proppant, or diverter is communicated into areas of formation 104 along wellbore 102.

In some implementations, the control signals sent by control subsystem 111 via signaling subsystem 114 may be formatted in such a way that the state of only one or a subset of an array of flow control devices along wellbore 102 is changed. For example, a shared electrical or hydraulic control line may transmit a control signal to multiple valves, and the control signal may be formatted to selectively change the state of only one (or a subset) of those valves. In some cases, the pressure, amplitude, frequency, duration, and/or other properties of the control signal determine which flow control device is modified by the control signal. In some cases, the pressure, amplitude, frequency, duration, and/or other properties of the control signal determine the state of the particular flow control device affected by the modification. It should be appreciated that the signals from control subsystem 111 may be sent directly to the downhole tools or indirectly via a communications subsystem of BHA 116. Further, the control signals may be reformatted, reconfigured, stored, converted, retransmitted, and/or otherwise modified as needed or desired en route between control subsystem 111 and the downhole tools of BHA 116.

In addition to the above-described flow control devices, BHA 116 may also include devices for collecting measurements relating to downhole operating conditions and formation characteristics along wellbore 102. In one or more embodiments, such measurement devices may include fiber-optic sensors for collecting real-time measurements of temperature or thermal energy downhole during production operations along wellbore 102. For example, the fiber-optic sensors may be components of a DTS subsystem of well system 100. However, it should be appreciated that BHA 116 may also include any of various measurement and diagnostic tools, including other types of sensors. Examples of such sensors include, but are not limited to, micro-seismic sensors, tiltmeters, pressure sensors, and other types of downhole sensing equipment. Such sensors may serve as real-time data sources for various types of downhole measurements and diagnostic information, e.g., for monitoring temperature, flow rate and/or other parameters along one or more sections 118 of wellbore 102 during the downhole operation. In one or more embodiments, signaling subsystem 114 may also be used to transmit the real-time measurements and diagnostic data collected downhole by the sensors to control subsystem 111 for processing at the surface. For example, DTS data collected by downhole fiber-optic sensors may be transmitted to control subsystem 111 via, for example, fiber optic cables included within signaling subsystem 114.

Control subsystem 111 (or data processing components thereof) may use the downhole data that it receives via signaling subsystem 114 to monitor and control wellsite operations in real time. In one or more embodiments, the wellsite monitoring and control functionality provided by control subsystem 111 may include applying the disclosed multi-zone production optimization techniques for real-time production analysis and optimization of flow distribution across multiple production zones, as will be described in further detail below with respect to FIGS. 2-6.

Figure 2:
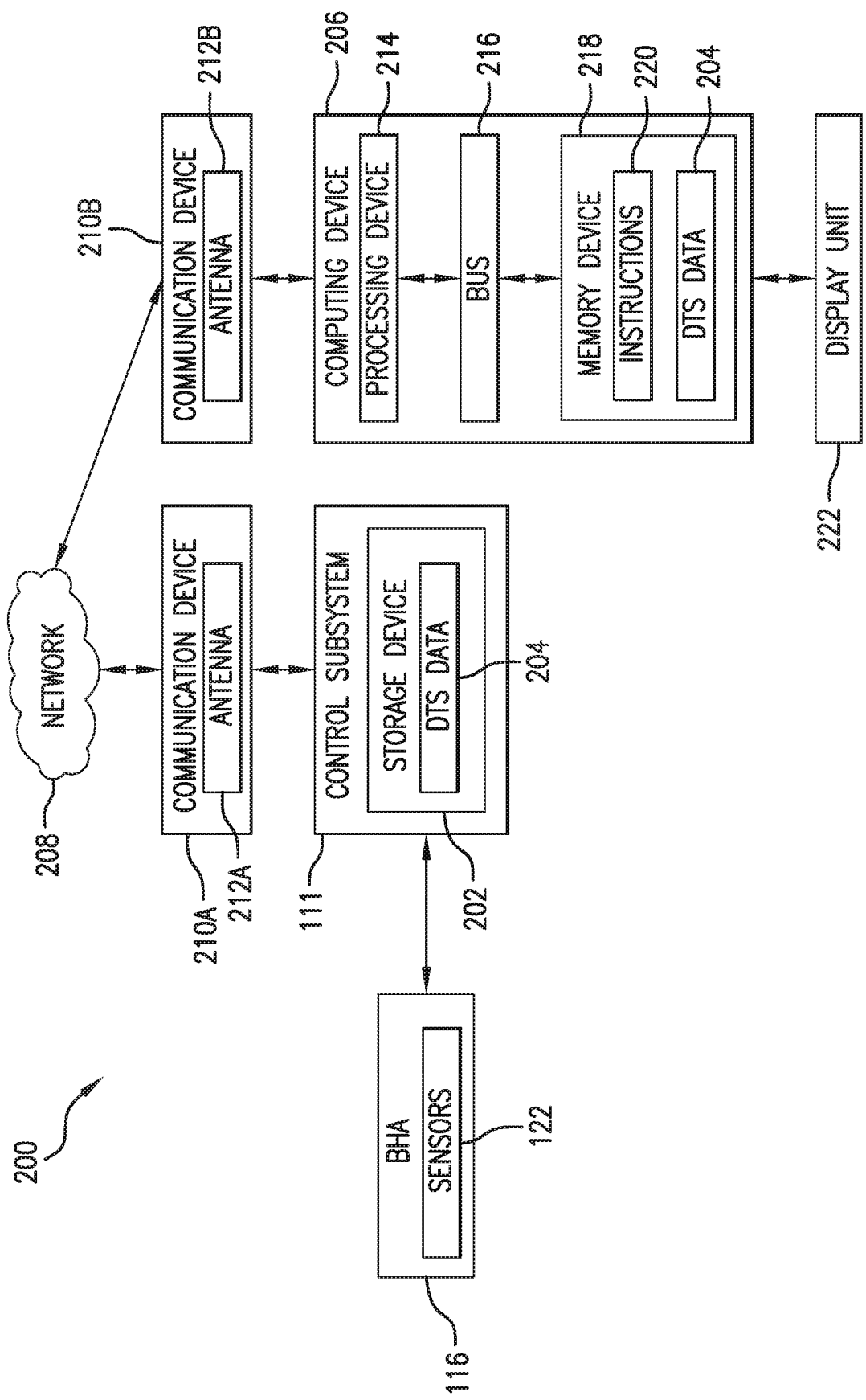
FIG. 2 is a block diagram of a system for optimizing flow distribution across multiple production zones along a wellbore during a downhole operation.

FIG. 2 is a block diagram of a system 200 for optimizing flow distribution across multiple production zones along a wellbore (e.g., wellbore 102 of FIG. 1, as described above). For purposes of discussion and explanation, system 200 will be described with reference to components of well system 100 of FIG. 1, as described above. For example, system 200 as shown in FIG. 2 includes control subsystem 111 and BHA 116 of FIG. 1. However, it should be noted that embodiments of the present disclosure are not intended to be limited thereto and that system 200 may be adapted to include any of various other components as desired for a particular implementation. For example, system 200 may include components or subsystems similar to those of well system 100 for implementing the disclosed multi-zone production optimization techniques within a marine-based well system for performing offshore production operations.

As shown in FIG. 2, control subsystem 111 may be communicatively coupled to BHA 116, e.g., via signaling subsystem 114 of FIG. 1, as described above. BHA 116 may include one or more downhole sensors 222 for collecting real-time measurements during production operations being performed along the wellbore. In one or more embodiments, downhole sensors 222 may include fiber-optic sensors of a DTS subsystem for collecting real-time temperature measurements along one or more sections of the wellbore, as described above. Such measurements may be transmitted from BHA 116 to control subsystem 111 at the surface of the wellbore. Control subsystem 111 may store the downhole measurements that it receives within a storage device 202 as DTS data 204. Storage device 202 may be any type of recording medium coupled to an integrated circuit that controls access to the recording medium. The recording medium can be, for example and without limitation, a semiconductor memory, a hard disk, or other similar type of memory or storage device.

In one or more embodiments, DTS data 204 may be transmitted from control subsystem 111 to a computing device 206 via a network 208. Network 208 may be any type of network or combination of networks used to communicate information between different computing devices. Network 208 can include, but is not limited to, a wired (e.g., Ethernet) or a wireless (e.g., Wi-Fi and 3G) network. In addition, network 208 can include, but is not limited to, a local area network, medium area network, and/or wide area network such as the Internet. Control subsystem 111 and the computing device 206 may be coupled to or include communication devices 210A and 210B, respectively. Communication devices 210A and 210B may include antennae 212A and 212B, respectively, for transmitting and receiving information via network 208. However, it should be appreciated that the disclosed embodiments are not limited thereto and that any suitable means may be employed for transmitting information between control subsystem 111 and computing device 206. In one or more embodiments, DTS data 204 may include raw information from sensors 222 of BHA 116, which may need to be appropriately processed and formatted by control subsystem 111 prior to being transmitted to computing device 206.

Computing device 206 may be any type of computer having at least one processor and a memory for storing data and instructions executable by the processor. Examples of such a computing device include, but are not limited to, a mobile phone, a personal digital assistant (PDA), a tablet computer, a laptop computer, a desktop computer, a workstation, a server, a cluster of computers, a set-top box, or other type of computing device. While not shown in FIG. 2, computing device 206 may also include an input/output (I/O) interface for receiving input or commands from a user via a user input device. The user input device may be, for example and without limitation, a mouse, a QWERTY or T9 keyboard, a touch-screen, a graphics tablet, or a microphone. The I/O interface also may be used by computing device 206 to output or present information via a display unit 230. Display unit 230 may be any type of display device, e.g., a cathode ray tubes (CRT), liquid crystal displays (LCD) or light emitting diode (LED) display, coupled to computing device 206. Display unit 230 may be used to display a digital representation of various types of information related to the production operations being performed along the wellbore. For example, such information may be presented to the user via a graphical user interface of a wellsite monitoring and control application executable at computing device 206.

In one or more embodiments, computing device 206 may include a processing device 214 coupled to a memory device 218 via a communication bus 216. Processing device 214 may be any type of processor, and memory device 218 may be any type of processor-readable or computer-readable storage medium including, but not limited to, a semiconductor memory, a hard disk, or other similar type of memory or storage device. Memory device 218 may be used to store DTS data 204 received from control subsystem 111 via network 208. Memory device 218 may also be used to store a set of instructions 220 executable by processing device 218. Instructions 220 may be processor-specific instructions generated by a compiler or an interpreter from code written in any suitable computer-programming language. Instructions 220, when executed, may cause processing device 214 to perform a plurality of functions or operations for monitoring and controlling the flow of hydrocarbons from multiple productions zones along the wellbore.

In one or more embodiments, flow control functions may be performed for one or more of the production zones to achieve an optimized flow distribution determined for the multiple production zones. As will be described in further detail below, the optimized flow distribution may be determined by using a forward production model as an objective function to minimize the variance between estimated or predicted temperature values derived from the forward model and actual temperature values based on DTS data 204.

Figure 3:
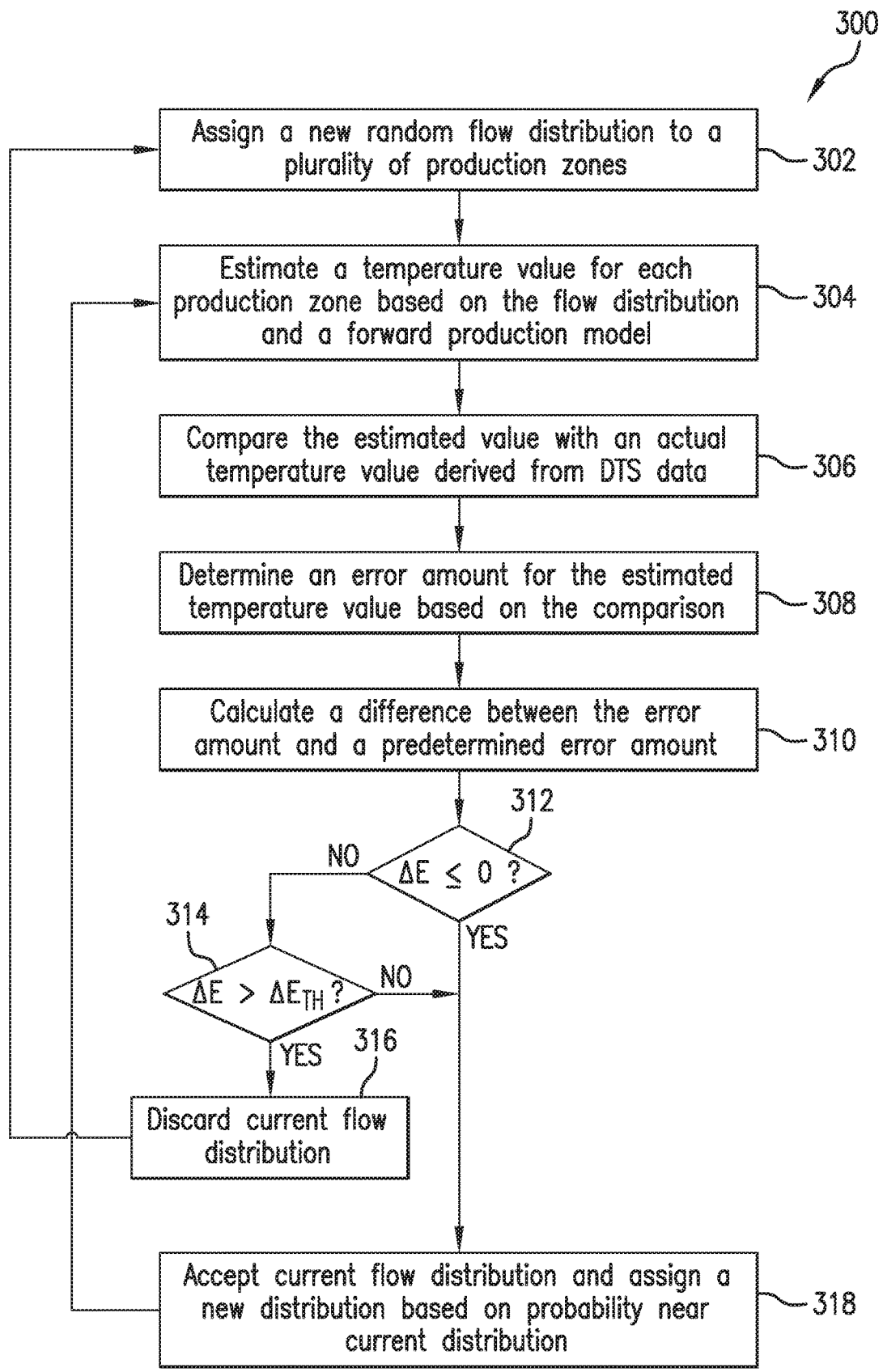
FIG. 3 is a flowchart of an illustrative process of optimizing flow distribution for multiple production zones along a wellbore.

FIG. 3 is a flowchart of an illustrative process 300 of optimizing flow distribution for multiple production zones along a wellbore. For purposes of discussion and explanation, process 300 will be described with reference to components of systems 100 and 200 of FIGS. 1 and 2, respectively, as described above. For example, process 300 may be implemented using control subsystem 111 of FIG. 1 or computing device 206 of FIG. 2. However, process 300 is not intended to be limited thereto. As will be described in further detail below, process 300 may be performed over multiple iterations until a globally optimum distribution has been achieved.

Figure 4A:
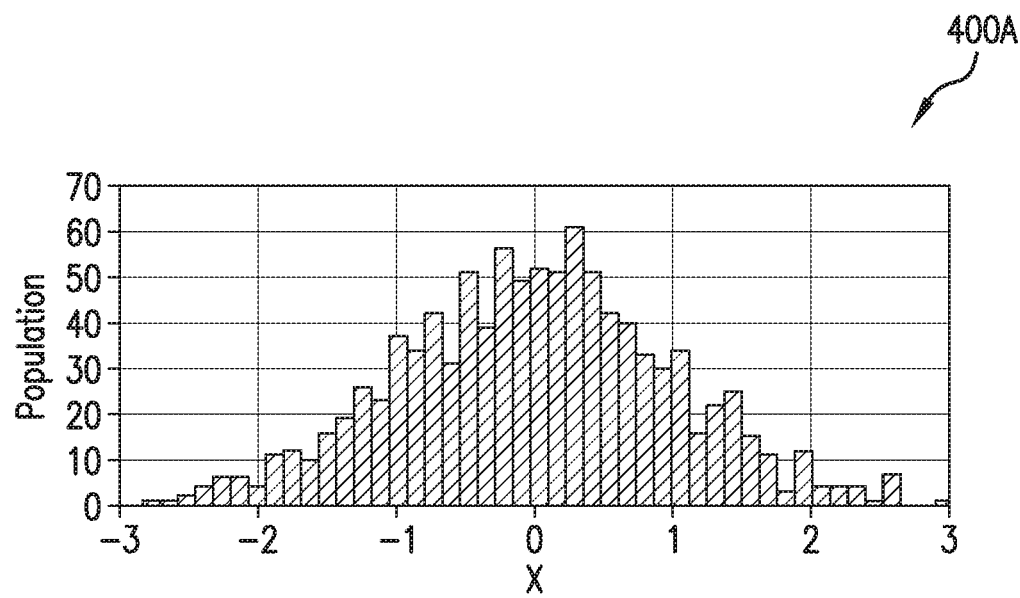
FIG. 4A is a graph of an illustrative normal distribution of a random variable with no upper or lower boundaries.
Figure 4B:
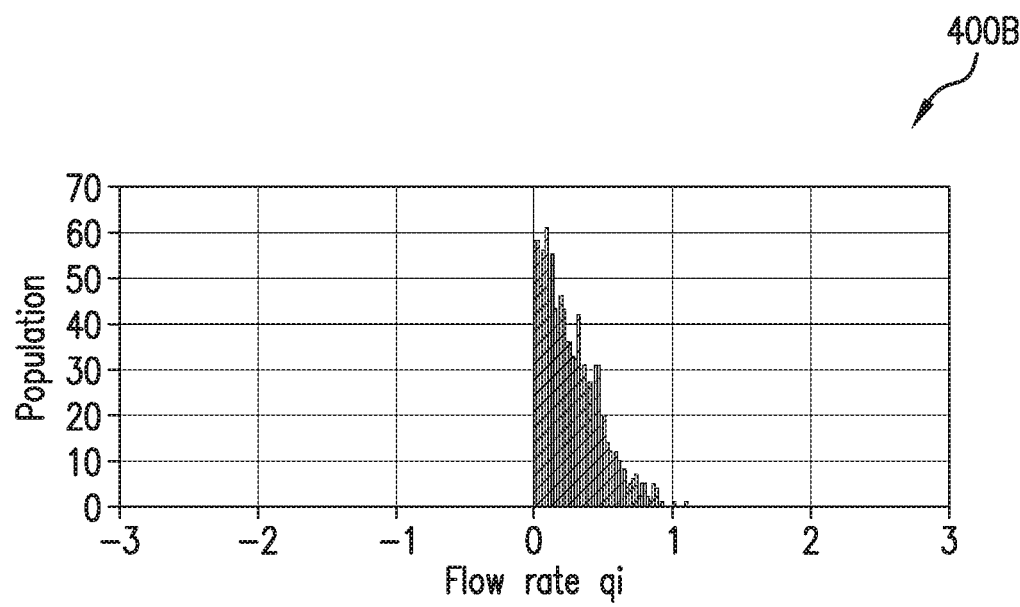
FIG. 4B is a graph of an illustrative normal distribution of flow rate assigned to each of a plurality of production zones along a wellbore for a global optimization of the flow distribution.

As shown in FIG. 3, process 300 begins in block 302, which includes assigning a new random flow distribution to a plurality of production zones. The flow distribution assigned to the production zones may be based on, but not directly from, a normal distribution, e.g., as shown in FIGS. 4A and 4B. In FIG. 4A, a standard normal distribution 400A is shown for a random variable x with no upper or lower boundaries. Normal distribution 400A may be based on a probability density function (PDF), as expressed by Equation (1):

$$PDF(x) = \frac{1}{\sigma\sqrt{2\pi}} e^{-\frac{1}{2}\left(\frac{x-\mu}{\sigma}\right)^2}, \tag{1}$$

where $\mu$ represents the mean and $\sigma^2$ represents the variance or standard deviation.

In FIG. 4B, a standard normal distribution 400B is shown for a random distribution of a flow rate variable (q) with a lower boundary set to a mean of 0 and an upper boundary set to a standard deviation of 1. In one or more embodiments, normal distribution 400B may be used in block 302 of FIG. 3 as a global optimization, to assign a flow rate to each of the production zones as a percentage of a total flow rate for the plurality of production zones. An example of such a flow distribution is shown in FIG. 5.

Figure 5:
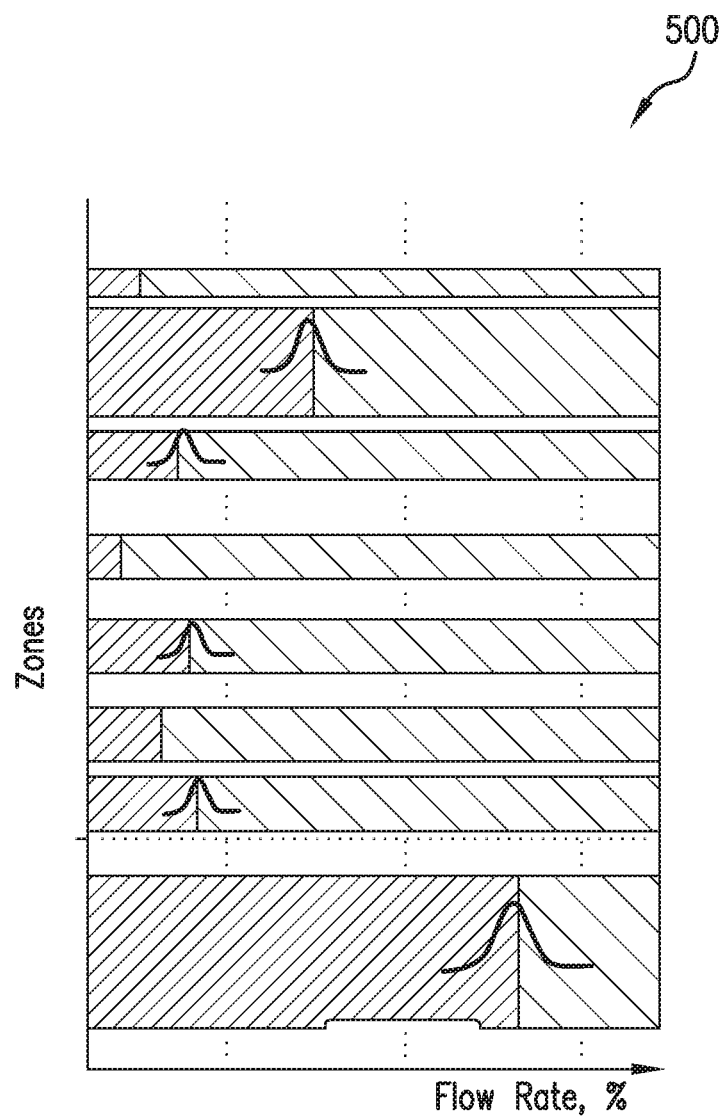
FIG. 5 is a diagram of an illustrative normal distribution of flow rate assigned to each of a plurality of production zones along a wellbore for a local optimization of the flow distribution.

FIG. 5 is a chart 500 illustrating an example of a normal distribution of flow rate assigned to each a plurality of production zones along a portion of the wellbore for a local optimization of the flow distribution, where each zone corresponds to a different row in chart 500. The flow rate assigned to the production zone for each row of chart 500 may be a random flow rate obtained by sampling normal distribution 400A of FIG. 4A, as described above. In this example, the optimized result of a previous iteration of process 300 may serve as the mean value of a sample space of possible flow distributions to be assigned to each production zone during a current iteration, where the variance is no larger than half of the optimized result from the previous iteration. While a total of eight zones are shown in FIG. 5, it should be appreciated that the disclosed techniques are not intended to be limited thereto and that these techniques may be applied to any number of production zones. The production zones in this example may be assigned flow rates according to a standard normal distribution, as described above.

Returning to FIG. 3, the flow distribution assigned to the production zones in block 302 may be represented in the form of an array or vector of flow rates corresponding to the production zones. Such a flow rate vector may be expressed as $q_i$ where i may be an index used to represent the flow rate for a given production zone in the plurality of zones along the wellbore. For example, the flow rate vector for a total of N production zones, where N may be any number greater than one, may be expressed as: $\{q_1, q_2, \ldots, q_N\}$.

Once the flow distribution or flow rates have been assigned to the production zones, process 300 may proceed to block 304. In block 304, a temperature value may be estimated for the fluid flow at locations inside and outside each production zone, including locations within the production tubing or pipe, based on the flow distribution assigned in block 302 and a forward production model. In one or more embodiments, the forward production model may be expressed using Equation (2) as follows:

$$C_p \rho \frac{\partial(qT_w)}{\partial z} + 2\pi r_w(\rho v_e C_p T_e) - 2\pi r_w U(T_w - T_r) + (\beta T_e - 1)q\nabla P = 0, \quad (2)$$

where $c_p$ is heat capacity of fluid in multiple phases, p is density of fluid in multiple phases, $r_w$ is radius of the wellbore, t is time, z is wellbore depth, $v_e$ is the flow rate over the surface area of the wellbore, $T_e$ is arriving temperature of the formation fluid before it enters the wellbore, U is an overall heat conduction coefficient, $T_w$ is fluid temperature inside the wellbore, $T_r$ is the temperature in the reservoir or formation, β is the gas or liquid volume expansion factor, q is flow rate, ∇p is pressure change. The temperature inside the wellbore ($T_w$) may be discretized into grids at different depths along the wellbore. The total number of grids that are defined may depend on the particular computing resources, processing speed and memory requirements, needed to achieve a desired level of system performance. Equation (2) may be used to solve for values of $T_w$ at all of the grids and corresponding depths along the wellbore.

In one or more embodiments, the estimation performed in block 304 may include applying one or more constraints to the flow rate distribution. Such constraints may include, for example and without limitation, an upper and/or lower bound for the flow rate, high flow rate constraints, low flow rate constraints, and a mass balance flow rate set to a value of one.

In block 306, the estimated temperature value may be compared with an actual temperature value at all depth grids (e.g., for grids corresponding to depths inside and outside the production zones along the wellbore). The actual temperature for a given depth grid may be derived from DTS data (e.g., DTS data 204 of FIG. 2, as described above) obtained for a corresponding depth or location along the wellbore.

In block 308, an error amount for the estimated temperature value may be determined based on the comparison performed in block 306. The error amount may be, for example, the difference between the estimated value and actual value of the temperature.

In block 310, a difference (or Δ) between the error amount from block 308 and a predetermined error amount may be calculated. The predetermined error amount may be a previously determined error amount for the estimated temperature from a prior iteration of process 300. For example, the calculated difference in block 310 may represent the amount of change in the error associated with the estimated temperature value between successive iterations of the simulated annealing scheme implemented using process 300.

In block 312, a determination is made as to whether or not the difference or change in the error amount (or ΔE) from the prior iteration is less than or equal to zero, i.e., whether or not there is either an improvement in the error amount or the error amount has remained unchanged from the prior iteration. For the first iteration of process 300, the predetermined error amount may be set to the same value as the current error amount determined in block 308.

If it is determined in block 312 that ΔE is less than or equal to zero, process 300 proceeds to block 318. In block 318, the current flow distribution, as assigned in block 302, is accepted and a new distribution is assigned using either a normal flow distribution, e.g., distribution 400B of FIG. 4B, as described above, or a flow distribution that is nearby or neighboring the current distribution of each production zone within the sample space of possible distributions, as described above with respect to the example of FIG. 5. After block 318, process 300 may return back to block 304 and the above-described operations may be repeated for another iteration of process 300.

Otherwise, if ΔE is determined to be greater than zero in block 312, process 300 proceeds to block 314, in which it is determine whether or not ΔE exceeds a predetermined error threshold $\Delta E_{TH}$. In one or more embodiments, the error threshold may be a probability criteria used to determine whether the magnitude of the change in the error amount exceeds an error tolerance for the current iteration of process 300. In one or more embodiments, the probability criteria may be periodically adjusted so that the tolerance for distributions that produce greater error (i.e., worse solutions) is gradually reduced over successive iterations of process 300. By accepting some solutions that are worse than previous solutions, a resulting distribution that provides only a local minimum or optimum, rather than a global optimum, may be avoided.

If it is determined that ΔE exceeds the error threshold/tolerance or probability criteria, process 300 proceeds to block 316 and the current distribution is discarded. After block 316, another iteration of process 300 may be performed by repeating the above-described operations starting again from block 302.

In one or more embodiments, the optimization performed using process 300 may be a version of a simulated annealing scheme to find a globally optimal distribution of flow rates across the multiple production zones along the wellbore. Accordingly, process 300 may be performed over multiple iterations until the optimum distribution is reached. The total number of iterations may be based on, for example, a target minimum error or a predetermined maximum number of iterations needed for the solution to converge, e.g., the targeted flow distribution at each iteration to converge to a global optimum.

In one or more embodiments, process 300 may be performed again for an additional number of iterations as part of a subsequent local optimization of the flow rate associated with each production zone, as described above with respect to FIG. 5, following the global optimization of the flow distribution across all of the production zones, as described above with respect to FIG. 4B. Such a local optimization may involve applying an individualized normal distribution to each production zone, where the targeted mean of the normal distribution is based on the globally optimum distribution obtained from the first set of iterations of process 300. The individual normal distribution may be applied when the estimated temperature values begin to converge with actual temperature values derived from DTS measurements for the production zones.

Figure 6:
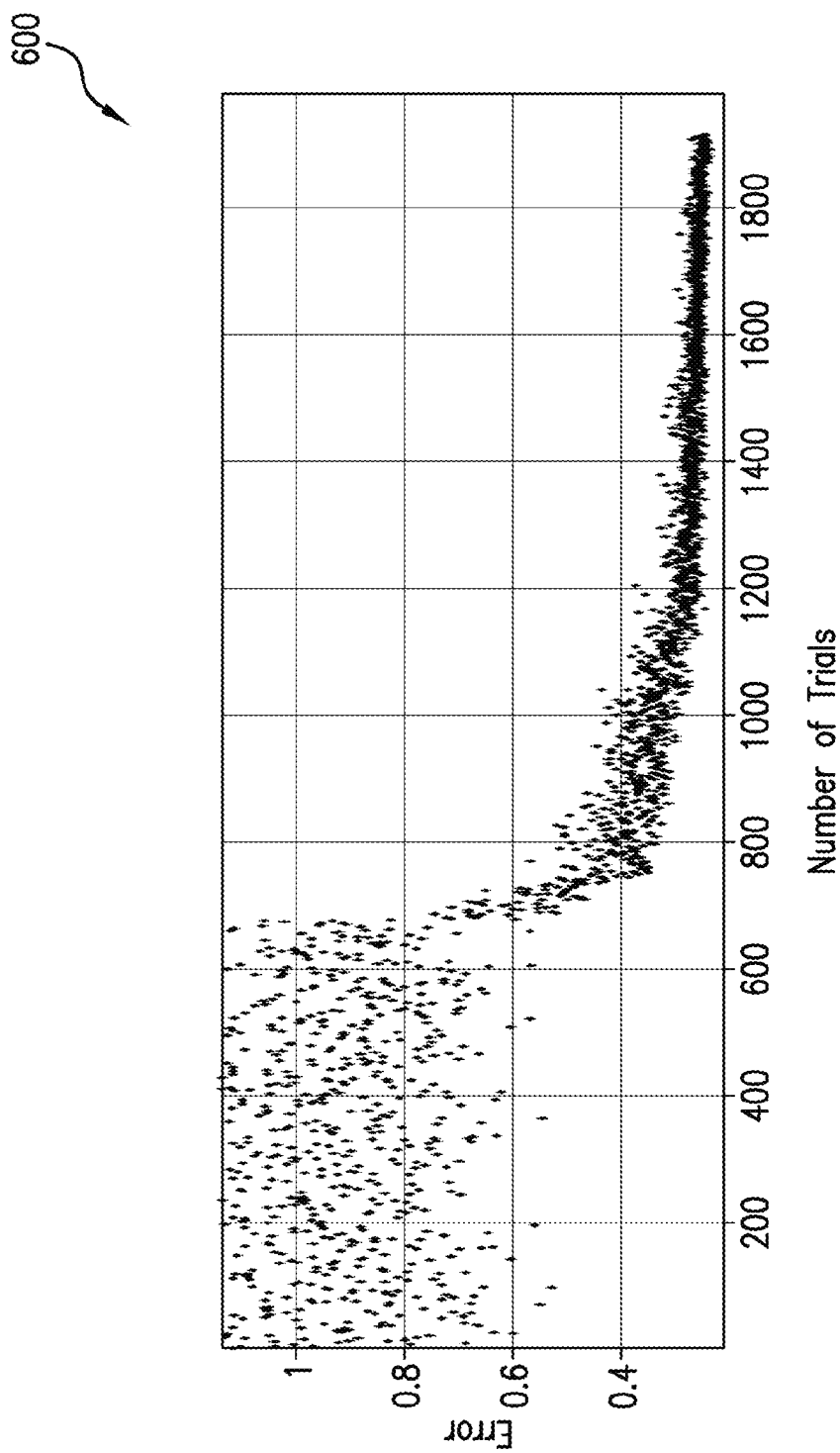
FIG. 6 is a graph illustrating the variance between actual and predicted temperature values over multiple iterations or trials.

FIG. 6 is a graph 600 illustrating an example of a convergence between actual and estimated temperature values over multiple iterations or trials of process 300 of FIG. 3, using the simulated annealing based global optimization scheme as described above. The estimated temperature at each iteration or trial in this example may be based on the flow distribution assigned (e.g., in block 302 and/or block 318 of process 300) to the plurality of production zones at each iteration.

As shown in FIG. 6, the variance or incoherence between the estimated temperature and the actual temperature (based on corresponding DTS measurements) along the wellbore starts to converge after approximately the $700^{th}$ iteration/ trial. The convergence point just after the 700$^{th}$ trial in this example may correspond to a starting point for a local optimization of each production zone flow rate profile in neighborhood of the globally optimized flow distribution result, as described above. For example, the global optimization (performed from iteration/trial 1 to 700) may produce a flow rate profile for each of the production zones along the wellbore by assigning a random flow rate distribution, as described above with respect to FIG. 4B. Based on the results of the global optimization, a local optimization may then be performed (after iteration/trial 700) in order to search for a more optimal solution that is "local" to (or near) the last (globally optimized) result for all the zones. Thus, each point after trial 700 in graph 600 may represent an error of the local optimization.

Figure 7:
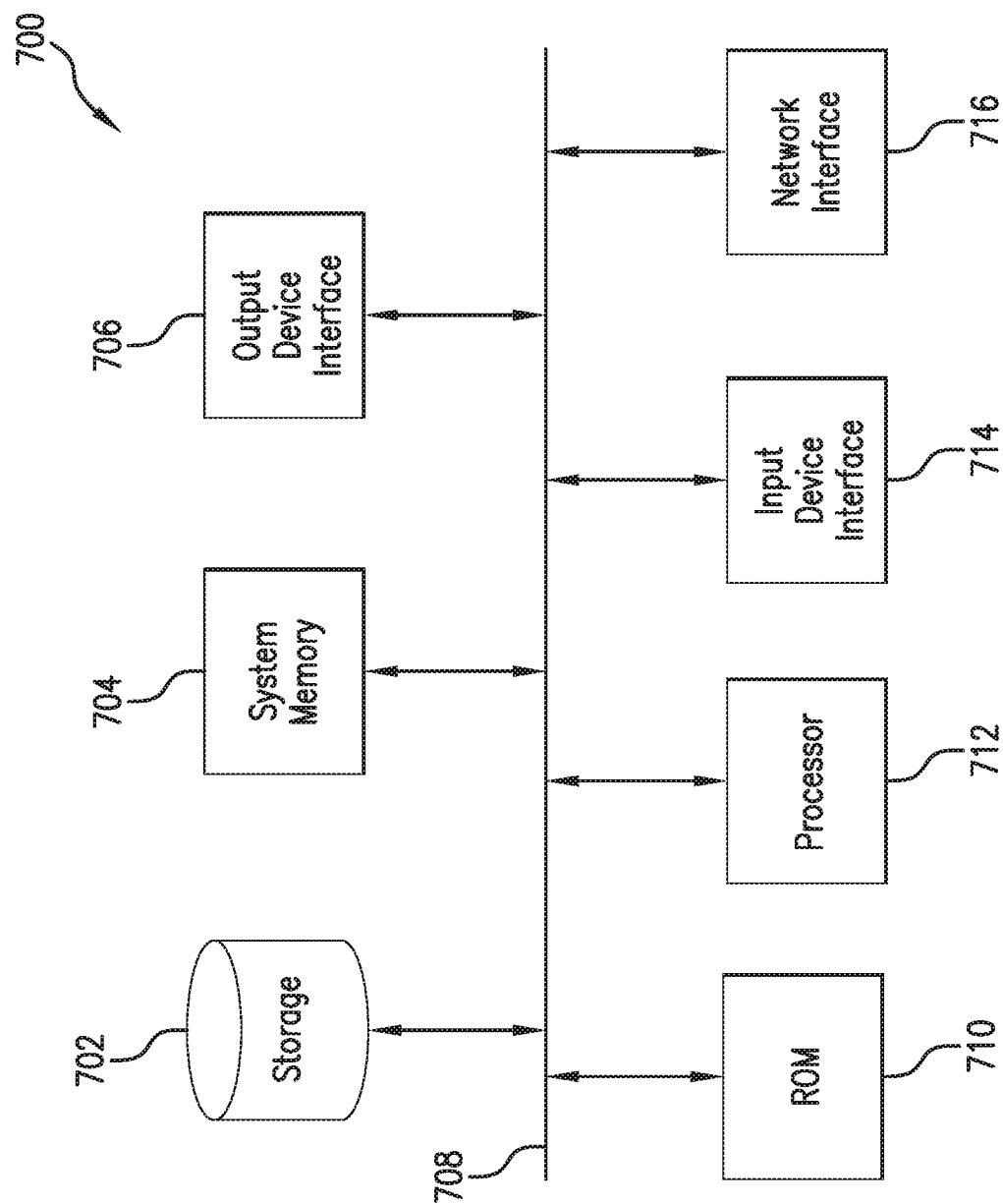
FIG. 7 is a block diagram of an illustrative computer system in which embodiments of the present disclosure may be implemented.

FIG. 7 is a block diagram of an illustrative computer system 700 in which embodiments of the present disclosure may be implemented. For example, computing device 206 of FIG. 2 and control subsystem 111 of FIGS. 1 and 2 in addition to process 300 of FIG. 3, as described above, may be implemented using system 700. System 700 can be a computer, phone, PDA, or any other type of electronic device. Such an electronic device includes various types of computer readable media and interfaces for various other types of computer readable media. As shown in FIG. 7, system 700 includes a permanent storage device 702, a system memory 704, an output device interface 706, a system communications bus 708, a read-only memory (ROM) 710, processing unit(s) 712, an input device interface 714, and a network interface 716.

Bus 708 collectively represents all system, peripheral, and chipset buses that communicatively connect the numerous internal devices of system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of system 700. Permanent storage device 702, on the other hand, is a read-and-write memory device. This device is a non-volatile memory unit that stores instructions and data even when system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for performing the multi-zone production optimization techniques in accordance with embodiments of the present disclosure, e.g., according to process 300 of FIG. 3, as described above. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the system 700. Input devices used with input device interface 714 include, for example, alphanumeric, QWERTY, or T9 keyboards, microphones, and pointing devices (also called "cursor control devices"). Output device interfaces 706 enables, for example, the display of images generated by the system 700. Output devices used with output device interface 706 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 7, bus 708 also couples system 700 to a public or private network (not shown) or combination of networks through a network interface 716. Such a network may include, for example, a local area network ("LAN"), such as an Intranet, or a wide area network ("WAN"), such as the Internet. Any or all components of system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, process 300 of FIG. 3, as described above, may be implemented using system 700 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for optimizing flow distribution across multiple production zones. Accordingly, advantages of the present disclosure include providing both global and local optimizations of the flow distribution without using an inverse model as in conventional optimization techniques. Unlike conventional solutions, which are prone to being trapped in a local minimum, the disclosed optimization techniques allow a globally optimal flow distribution to be determined for multiple production zones without converging toward a local minimum.

A computer-implemented method of optimizing flow distribution across multiple production zones has been described. Embodiments of the method may include: assigning a flow distribution to a plurality of production zones along a wellbore within a formation; estimating a temperature value for each of the production zones, based on the assigned flow distribution; comparing the estimated temperature value with an actual temperature value determined for each production zone; calculating an error amount for the estimated temperature value, based on the comparison; determining whether or not the flow distribution has reached a global optimum, based on the error amount; and repeating the assigning, the estimating, the comparing, the calculating, and the determining over a plurality of iterations until it is determined that the flow distribution assigned to the plurality of production zones has reached the global optimum. Likewise, embodiments of a computer-readable storage medium having instructions stored therein have been described, where the instructions, when executed by a processor, may cause the processor to perform a plurality of functions, including functions to: assign a flow distribution to a plurality of production zones along a wellbore within a formation; estimate a temperature value for each of the production zones, based on the assigned flow distribution; compare the estimated temperature value with an actual temperature value determined for each production zone; calculate an error amount for the estimated temperature value, based on the comparison; determine whether or not the flow distribution has reached a global optimum, based on the error amount; and repeat the assigning, the estimating, the comparing, the calculating, and the determining over a plurality of iterations until it is determined that the flow distribution assigned to the plurality of production zones has reached the global optimum.

The foregoing embodiments of the method or computer-readable storage medium may include any one or any combination of the following elements, features, functions, or operations: the estimating further includes applying one or more constraints to the flow distribution assigned to the plurality of production zones; the one or more constraints are selected from the group consisting of a lower bound of the flow distribution, an upper bound of the flow distribution, a low flow rate constraint, and a high flow rate constraint; the determining further includes calculating a difference between the error amount for a current iteration and a predetermined error amount associated with a prior iteration, determining whether the difference exceeds a probability criteria, and accepting the flow distribution assigned to the plurality of production zones when it is determined that the difference does not exceed the probability criteria; the flow distribution assigned to the plurality of production zones for a subsequent iteration is a neighboring flow distribution within a standard normal distribution sample space; the actual temperature value is determined based on measurements obtained from downhole fiber optic sensors within the wellbore; the downhole fiber optic sensors are associated with a Distributed Temperature Sensing (DTS) system; the flow distribution is randomly assigned to the plurality of production zones along the wellbore; and the flow distribution is assigned to the plurality of production zones based on a probability density function.

Furthermore, embodiments of a system including at least one processor and a memory coupled to the processor have been described, where the memory stores instructions, which, when executed by a processor, may cause the processor to perform a plurality of functions, including functions to: assign a flow distribution to a plurality of production zones along a wellbore within a formation; estimate a temperature value for each of the production zones, based on the assigned flow distribution; compare the estimated temperature value with an actual temperature value determined for each production zone; calculate an error amount for the estimated temperature value, based on the comparison; determine whether or not the flow distribution has reached a global optimum, based on the error amount; and repeat the assigning, the estimating, the comparing, the calculating, and the determining over a plurality of iterations until it is determined that the flow distribution assigned to the plurality of production zones has reached the global optimum.

The foregoing embodiments of the system may also include any one or any combination of the following elements, features, functions, or operations: applying one or more constraints to the flow distribution assigned to the plurality of production zones; the one or more constraints are selected from the group consisting of a lower bound of the flow distribution, an upper bound of the flow distribution, a low flow rate constraint, and a high flow rate constraint; calculating a difference between the error amount for a current iteration and a predetermined error amount associated with a prior iteration; determining whether the difference exceeds a probability criteria; accepting the flow distribution assigned to the plurality of production zones when it is determined that the difference does not exceed the probability criteria, where the flow distribution assigned to the plurality of production zones for a subsequent iteration may be a neighboring flow distribution within a standard normal distribution sample space; the actual temperature value is determined based on measurements obtained from downhole fiber optic sensors within the wellbore; the downhole fiber optic sensors are associated with a Distributed Temperature Sensing (DTS) system; the flow distribution is randomly assigned to the plurality of production zones along the wellbore; and the flow distribution is assigned to the plurality of production zones based on a probability density function.

While specific details about the above embodiments have been described, the above hardware and software descriptions are intended merely as example embodiments and are not intended to limit the structure or implementation of the disclosed embodiments. For instance, although many other internal components of the system 700 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:
1. A computer-implemented method of optimizing flow distribution across multiple production zones, the method comprising:
assigning a random flow distribution to a plurality of production zones along a wellbore within a formation, based on a flow rate randomly assigned to each of the plurality of production zones as a percentage of a total flow rate assigned to the plurality of production zones along the wellbore;
estimating a temperature value for each of the production zones, based on the assigned random flow distribution;
comparing the estimated temperature value with an actual temperature value determined for each production zone;
calculating an error amount for the temperature value estimated for each production zone, based on the comparison;
determining whether or not the random flow distribution has reached a global optimum, based on the error amount; and
repeating the assigning, the estimating, the comparing, the calculating, and the determining over a plurality of iterations until it is determined that the random flow distribution assigned to the plurality of production zones has reached the global optimum.

2. The method of claim 1, wherein the estimating further comprises applying one or more constraints to the random flow distribution assigned to the plurality of production zones.

3. The method of claim 2, wherein the one or more constraints are selected from the group consisting of: a lower bound of the random flow distribution; an upper bound of the random flow distribution; a low flow rate constraint; and a high flow rate constraint.

4. The method of claim 1, wherein the determining further comprises:
calculating a difference between the error amount for a current iteration and a predetermined error amount associated with a prior iteration;
determining whether the difference exceeds an error threshold for the current iteration;
accepting the random flow distribution assigned to the plurality of production zones as the global optimum when it is determined that the difference does not exceed the error threshold; and
adjusting the error threshold for a subsequent iteration when it is determined that the difference exceeds the error threshold.

5. The method of claim 1, wherein the actual temperature value is determined based on measurements obtained from downhole fiber optic sensors within the wellbore.

6. The method of claim 5, wherein the downhole fiber optic sensors are associated with a Distributed Temperature Sensing (DTS) system.

7. The method of claim 1, wherein the random flow distribution is assigned to the plurality of production zones based on a probability density function.

8. A system for optimizing flow distribution across multiple production zones, the system comprising:
at least one processor; and
a memory coupled to the processor having instructions stored therein, which when executed by the processor, cause the processor to perform functions, including functions to:
assign a random flow distribution to a plurality of production zones along a wellbore within a formation, based on a flow rate randomly assigned to each of the plurality of production zones as a percentage of a total flow rate assigned to the plurality of production zones along the wellbore;
estimate a temperature value for each of the production zones, based on the assigned random flow distribution;
compare the estimated temperature value with an actual temperature value determined for each production zone;
calculate an error amount for the temperature value estimated for each production zone, based on the comparison;
determine whether or not the random flow distribution has reached a global optimum, based on the error amount; and
repeat the assigning, the estimating, the comparing, the calculating, and the determining over a plurality of iterations until it is determined that the random flow distribution assigned to the plurality of production zones has reached the global optimum.

9. The system of claim 8, wherein the functions performed by the processor further comprise functions to:
apply one or more constraints to the random flow distribution assigned to the plurality of production zones.

10. The system of claim 9, wherein the one or more constraints are selected from the group consisting of: a lower bound of the random flow distribution; an upper bound of the random flow distribution; a low flow rate constraint; and a high flow rate constraint.

11. The system of claim 8, wherein the functions performed by the processor further comprise functions to:
calculate a difference between the error amount for a current iteration and a predetermined error amount associated with a prior iteration;
determine whether the difference exceeds an error threshold for the current iteration;
accept the random flow distribution assigned to the plurality of production zones as the global optimum when it is determined that the difference does not exceed the error threshold; and
adjust the error threshold for a subsequent iteration when it is determined that the difference exceeds the error threshold.

12. The system of claim 8, wherein the actual temperature value is determined based on measurements obtained from downhole fiber optic sensors within the wellbore.

13. The system of claim 12, wherein the downhole fiber optic sensors are associated with a Distributed Temperature Sensing (DTS) system.

14. The system of claim 8, wherein the random flow distribution is assigned to the plurality of production zones based on a probability density function.

15. A non-transitory computer-readable storage medium having instructions stored therein, which when executed by a computer cause the computer to perform a plurality of functions, including functions to:
assign a random flow distribution to a plurality of production zones along a wellbore within a formation, based on a flow rate randomly assigned to each of the plurality of production zones as a percentage of a total flow rate assigned to the plurality of production zones along the wellbore;
estimate a temperature value for each of the production zones, based on the assigned random flow distribution;
compare the estimated temperature value with an actual temperature value determined for each production zone;
calculate an error amount for the temperature value estimated for each production zone, based on the comparison;
determine whether or not the random flow distribution has reached a global optimum, based on the error amount; and repeat the assigning, the estimating, the comparing, the calculating, and the determining over a plurality of iterations until it is determined that the random flow distribution assigned to the plurality of production zones has reached the global optimum.

16. The non-transitory computer-readable storage medium of claim 15, wherein the functions performed by the computer further comprise functions to:
apply one or more constraints to the random flow distribution assigned to the plurality of production zones, and
wherein the one or more constraints are selected from the group consisting of: a lower bound of the random flow distribution; an upper bound of the random flow distribution; a low flow rate constraint; and a high flow rate constraint.

17. The non-transitory computer-readable storage medium of claim 15, wherein the functions performed by the computer further comprise functions to:
calculate a difference between the error amount for a current iteration and a predetermined error amount associated with a prior iteration; determine whether the difference exceeds an error threshold for the current iteration;
accept the random flow distribution assigned to the plurality of production zones as the global optimum when it is determined that the difference does not exceed the error threshold; and
adjust the error threshold for a subsequent iteration when it is determined that the difference exceeds the error threshold.

18. The non-transitory computer-readable storage medium of claim 15, wherein the actual temperature value is determined based on measurements obtained from downhole fiber optic sensors within the wellbore, and the downhole fiber optic sensors are associated with a Distributed Temperature Sensing (DTS) system.

* * * * *